(12) United States Patent
Gillie

(10) Patent No.: US 9,135,835 B2
(45) Date of Patent: Sep. 15, 2015

(54) STAIN-RESISTANT LABEL ADHERED TO PRODUCT INCLUDING ONE OR MORE LABEL-STAINING MATERIALS THEREIN

(71) Applicant: Taghleef Industries Inc., Wilmington, DE (US)

(72) Inventor: James Kevin Gillie, Middletown, DE (US)

(73) Assignee: Taghleef Industries, Inc., Wilmington, DE (US)

( * ) Notice: Subject to any disclaimer, the term of this patent is extended or adjusted under 35 U.S.C. 154(b) by 112 days.

(21) Appl. No.: 13/927,483

(22) Filed: Jun. 26, 2013

(65) Prior Publication Data

US 2014/0004317 A1   Jan. 2, 2014

Related U.S. Application Data

(60) Provisional application No. 61/664,986, filed on Jun. 27, 2012.

(51) Int. Cl.
| | | |
|---|---|---|
| *B32B 27/00* | (2006.01) | |
| *B32B 25/08* | (2006.01) | |
| *B32B 25/12* | (2006.01) | |
| *B32B 27/32* | (2006.01) | |
| *G09F 3/10* | (2006.01) | |
| *C08J 7/00* | (2006.01) | |
| *C09J 133/00* | (2006.01) | |
| *G09F 3/02* | (2006.01) | |

(52) U.S. Cl.
CPC . *G09F 3/10* (2013.01); *B32B 27/00* (2013.01); *C08J 7/00* (2013.01); *C09J 133/00* (2013.01); *G09F 2003/0235* (2013.01); *G09F 2003/0241* (2013.01); *Y10T 428/24802* (2015.01); *Y10T 428/31573* (2015.04); *Y10T 428/31837* (2015.04); *Y10T 428/31931* (2015.04)

(58) Field of Classification Search
None
See application file for complete search history.

(56) References Cited

U.S. PATENT DOCUMENTS

| | | | |
|---|---|---|---|
| 5,058,648 A | 10/1991 | Kansupada | |
| 6,761,969 B2 | 7/2004 | Li et al. | |
| 7,060,362 B2 | 6/2006 | Li et al. | |
| 2003/0211273 A1 | 11/2003 | Perry et al. | |
| 2004/0095244 A1* | 5/2004 | Conwell et al. | 340/572.8 |
| 2004/0191529 A1* | 9/2004 | Gillie | 428/424.2 |
| 2005/0256251 A1 | 11/2005 | Amano et al. | |
| 2006/0228504 A1* | 10/2006 | Wilkie | 428/35.7 |
| 2011/0033698 A1 | 2/2011 | Woods et al. | |

FOREIGN PATENT DOCUMENTS

| | | |
|---|---|---|
| EP | 1073031 B1 | 7/2008 |
| EP | 1534502 B1 | 5/2013 |
| GB | 2018718 A | 10/1979 |
| JP | 09-302328 A | 11/1997 |
| JP | 2010-229222 A | 10/2010 |

OTHER PUBLICATIONS

International Search Report (PCT/ISA/210), Notification of Transmittal of International Search Reprot (PCT/ISA/220), and Written Opinion (PCT/ISA237) issued Sep. 4, 2013 for related International Application No. PCT/US2013/048234.

\* cited by examiner

*Primary Examiner* — Mark Ruthkosky
*Assistant Examiner* — Laura C Powers
(74) *Attorney, Agent, or Firm* — Caesar Rivise, PC

(57) ABSTRACT

In combination, a plastic label attached to an outer surface of a product by a pressure sensitive adhesive. The pressure sensitive adhesive is attached to an exposed surface of an inner surface layer of the label, and the product includes one or more materials capable of migrating through the label and providing visible stains therein. The inner surface layer of the label includes a hydroxyl functionalized polyether amine resin preventing the material exuded from the product from migrating through the label thickness to provide visible staining of said label. A single extruded film of the label or the core of a multilayer label including either high crystalline polypropylene homopolymer, with or without a hard resin, or a conventional polypropylene with a hard resin.

13 Claims, No Drawings

STAIN-RESISTANT LABEL ADHERED TO PRODUCT INCLUDING ONE OR MORE LABEL-STAINING MATERIALS THEREIN

RELATED APPLICATION

This application claims the benefit of the filing date of provisional patent application Ser. No. 61/664,986, filed on Jun. 27, 2012.

FIELD OF INVENTION

This invention relates generally to the combination of a stain-resistant label adhered to a product that includes one or more materials capable of migrating through, and staining a label. Preferably the product to which the label is adhered is a rubber-based product and most preferably is a vehicular tire. However, other products, such as batteries and candles exude label-staining material and the labels of this invention also are usable in these latter environments. Preferably the labels in this invention are pressure sensitive labels including printed indicia thereon.

BACKGROUND OF THE INVENTION

A number of requirements exist for a pressure sensitive label including printed indicia thereon and adhered to a product that includes one or more materials therein that are capable of migrating through and staining a label adhered to such a product. In particular, and most particularly in connection with rubber based products such as vehicle tires, these requirements include good printability characteristics with flexographic inks and thermal transfer; good flexibility and drapability to permit desired conformability to the surface of the product; ease of dispensing and excellent stain resistance. It is this last requirement that has been the most difficult to achieve. It appears that migratory materials in a number of products, and in particular rubber-based products such as tires, tend to migrate into attached labels causing undesired surface staining of the label. Label-staining migratory materials also are present in a variety of other products, such as candles and batteries, and the labels of this invention are usable with any of these products. The exact nature of the migratory materials from rubber-based products such as tires is not known at this time but the staining problem created by such materials is quite prevalent during sustained periods of storage of the labeled products.

A number of film structures have been tested in connection with the stain resistance requirement. PVdC coated white films have worked fairly well in reducing staining; however they have presented environmental issues. Metallized films also have worked well, but for many applications, and in particular in applications on vehicular tires, the appearance of such metallized films is not desirable.

Stain resistant labels for use on tires are disclosed in Conwell et al. U.S. Publication 2004/0095244 and also in Majumdar U.S. Pat. No. 6,221,453. The labels disclosed in the Conwell '244 publication include a barrier layer or film of polyester, e.g., PET. The labels disclosed in the Majumdar '453 patent discloses a variety of materials that act as barriers to stain creating components in tires, including metals, polyesters, cellophane, fluorinated polymers, poly(vinyl acetate), poly(vinyl alcohol), poly(vinyl pyrrolidone) or its copolymer with vinyl acetate.

A number of the prior art components for use in preventing staining in tire labels, either need to be coextruded as part of the label construction or, due to a lack of elasticity, need to be applied as a separate coating after biaxial orientation of other, coextruded components of the label. Extrusion equipment may not be available to handle the coextrusion of a label product with an additional barrier layer. In addition, other prior art components are provided as a separate film and therefore can only be applied to the coextruded label structure off-line, after biaxial orientation of the coextruded components of the label.

Solvent resistant label structures attached to containers including a hydrocarbon solvent therein are disclosed in Wilkie U.S. Pat. No. 8,158,227, assigned to the assignee of this application, Taghleef Industries, Inc. (formerly Applied Extrusion Technologies, Inc.). The label disclosed in the '227 patent eliminates or minimizes the distortion of the label when the label is exposed to the solvent in, or on the surface of the container. The labels disclosed in the '227 patent do not relate to or address any staining issues of labels attached to products including migratory materials therein; in particular in connection with the attachment of labels to rubber-based products such as tires. It is in connection with the attachment of labels to products including stain-creating, migratory materials therein that the staining problem addressed by the present invention is encountered.

In fact, the most preferred label structure disclosed in the '227 patent is a wrap around structure wherein the surface of the label engaging the container is free of adhesive; overlapping ends being secured together by an adhesive. Although non-wrap-around label structures are disclosed as being within the broadest scope of the invention, an expressed concern relating to the use of such a label structure is that an adhesive required to be used to attach the label to the container would be attacked by the solvent in the container and cause the label to become loose or separate from the container.

The present invention solves and/or minimizes the label-staining problem encountered with the use of prior art label structures adhered to products including stain-creating migratory materials therein; without requiring the inclusion of a metallized surface layer and with the versatility of employing coating technology, either on-line or off-line as desired.

SUMMARY OF THE INVENTION

In combination, a plastic label attached to a product that includes one or more organic materials capable of migrating through the label and staining the surface thereof. Most preferably the plastic label is adhered to the outer surface of the product by a pressure sensitive adhesive. The inner surface layer of the label for receiving the pressure sensitive adhesive includes a hydroxyl functionalized polyether amine resin preventing organic material in the product to which it is attached from migrating through the label thickness to provide visible staining of said label.

Most preferably the product to which the label is attached by the pressure sensitive adhesive is a rubber-based product; most preferably a vehicular tire. However, the labels of this invention are useable with other products that exude label-staining components, such as batteries, candles and similar items.

In an extruded, monolayer label structure a maleated polyolefin can be blended into the polymer of the monolayer structure to make that structure compatible with a separate coated layer employing hydroxyl functionalized polyether amine.

In a preferred embodiment of the invention employing a multilayer label structure a maleated polyolefin tie layer is provided between a core layer of the label and the hydroxyl functionalized polyether amine layer.

Most preferably the label is a multilayer structure including an interior core layer employing a polyolefin homopolymer or copolymer with an inner surface layer on one side of said core layer and including the hydroxyl functionalized polyether amine resin therein. The exposed surface of the inner surface layer includes a pressures sensitive adhesive thereon. The label further includes an additional surface layer on the side of the core layer opposed to the inner surface layer.

In the most preferred embodiment, the plastic label includes a layer spaced outwardly from the inner layer and including printed indicia thereon. Most preferably the printed layer is a coating of a polyurethane resin.

Most preferably the core layer and the inner surface layer are coextruded and biaxially oriented; the additional layer being a urethane coating that is applied to the core layer either in-line, between a machine direction orientation and a transverse direction orientation of a two-step tentering operation, or off-line, after biaxial orientation of the coextruded components.

The inner surface layer employing the hydroxyl functionalized polyether amine resin is applied to the core layer as a coating between a machine direction orientation and a transverse direction orientation of a two-step tentering operation or off-line after the coextruded components have been biaxially oriented. When the inner layer is applied to the core layer between the machine direction and transverse direction orientation steps the opposed urethane coating can be applied off-line to the core layer on a side opposed to the hydroxyl functionalized polyether amine layer.

DETAILED DESCRIPTION OF THE INVENTION

Reference in this application to "polypropylene" unless indicated otherwise or more specifically, means a crystalline propylene homopolymer or a copolymer of propylene with another α-monoolefin having from 2 to 8 carbon atoms in an amount insufficient to have a significant effect on the crystallinity of the polypropylene. Typically, this is ethylene in an amount of less than 2%, and more preferably less than 1% by the weight of the polymer. These later copolymers also are sometimes referred to as "minirandom" copolymers. Included within the definition of polypropylene are "high crystallinity polypropylene" and "conventional polypropylene" as defined hereinafter.

Reference to "high crystallinity polypropylene" means a polypropylene having intermolecular stereoregularity greater than 93%.

Reference to "conventional polypropylene means polypropylene having an intermolecular stereoregularity no greater than 93%.

Reference in this application to "polypropylene copolymer" unless indicated otherwise, means a copolymer of propylene with another α-monoolefin having from 2-8 carbon atoms in an amount of 2% or greater. Most preferably the polypropylene copolymer is a propylene/ethylene copolymer having an ethylene content of no more than 10% by weight.

Reference in this application to "α-monoolefin" unless indicated otherwise, means a linear unsaturated hydrocarbon monomer having one carbon-carbon double bond, which double bond is located at the end of the linear chain. The term is intended to include any such monomer having 8 carbon atoms or less, including ethylene and propylene.

The term "self-supporting" in reference to a film, label or layer means that the film, label or layer can support itself without the aid of any additional supporting layers to provide the necessary strength and body to permit it to be handled without being adhered to another substrate. Such a film, label or layer may also be referred to as a "stand-alone" label, film or layer, as the case may be.

Reference throughout this application to the labels being "multi-component" structures means that the labels are laminates of individual films; each film either may or may not be a multilayer structure. Most preferably each film of the laminate is a multilayer structure having an internal core layer and one or more layers on opposed sides of the core layer. The labels of this invention may include graphics or other visible indicia to identify the product, or attributes of the product, to which the label is attached.

Although it is within the broadest scope of this invention to employ an extruded monolayer label construction, the most preferred embodiments of this invention are multilayer constructions, as will be described in greater detail hereinafter.

A typical label structure includes one or more films, each employing a core comprising polypropylene, a polypropylene copolymer or blends of such polypropylene and polypropylene copolymer, and one or more additional polymer layers on opposed sides of the core. The label can be either clear or opaque. Most preferably the opaque structure is formed by including any well-known voiding agent, e.g., calcium carbonate in an interior core layer of a multilayer film employed in the label structure and not in a surface layer. Alternatively, the labels can be made white by including a whitening agent, such as titanium dioxide (TiO2), in the core layer and/or in one of the skin layers.

The layers included in the multilayer films employed in the labels of this invention must be compatible to permit those layers to be laminated together, coextruded together or formed by coating. When, necessary, in order to provide such compatibility suitable tie layers can be employed, e.g., a tie layer including maleated polyolefin can be employed to provide compatibility between a polyolefin resin layer and other coatings or layers that are not compatible with the specific polyolefins employed in the polyolefin resin layer, such as a polyether amine resin layer.

Conventional additives, in conventional amounts, can be included in the multi-component labels of this invention, provided that no additive should be included that can negatively affect the performance of the film layer in which it is included or of the multi-component label structure, e.g., by causing undesired void space or by migrating into another layer and negatively affecting the performance of that layer in carrying out its intended function. Suitable conventional additives include antioxidants, pigments, orientation stress modifiers, flame retardants, anti-foaming additives, antistatic agents, antifog agents, antiblocking agents and slip agents.

The films from which the labels of this invention are formed can be manufactured by a variety of well-known film forming methods including conventional mono and multilayer extrusion and coextrusion processes, mono or coextrusion coating processes wherein a coating or layer is extruded onto an extruded monolayer or multilayer film between the machine direction and cross-machine direction orienting steps, a conventional in-line coating operation wherein the coating of the polar polymer is applied by a conventional coating operation between the machine direction and cross-machine direction orienting steps, or in a conventional out-of-line coating operation. In the above processes, the completed polymeric film employed in the labels of this invention can be biaxially oriented as part of a conventional coextrusion operation wherein all layers of a multilayer film are coextruded and then simultaneously oriented in both the machine direction and cross-machine direction.

Alternatively, all of the film layers, except for print-receiving layer can be biaxially oriented; resulting from the print layer being applied to previously extruded layers of the film between the machine direction and cross-machine direction orientation operations, or after the coextruded film has been biaxially oriented. In this embodiment the hydroxyl functionalized polyether amine resin layer is applied as a coating to the film off-line, after the coextruded film has been provided with the print-receiving layer. In accordance with the broadest aspects of this invention, the film-extrusion processes can be carried out on any well-known film-extrusion systems, e.g., tenter or tubular.

In an alternative formation method in accordance with this invention, the hydroxyl functionalized polyether amine resin layer can be applied as a coating to a coextruded film in-line, between the machine direction and transverse direction orientation steps, and the printable coating can be applied off-line to the coextruded film layer opposed to the layer that received the hydroxyl functionalized polyether amine resin layer.

Labels within the scope of this invention are considered to have the most acceptable performance if no staining is visible on the surface of the label after the label has been secured to a product including stain-creating material(s) therein and the combined product-label structure is put in an oven at 150 degrees F. for a period of 72 hours and then removed from the oven and stored under ambient conditions for a period of two weeks. This testing procedure has been approved or recognized by tire manufacturers.

The following exemplary product constructions are disclosed for purposes of completeness. However, the scope of the invention is not intended to be limited to the specifically disclosed structures; but only by the scope of the claims appended hereto. For example, although the most preferred combination employs a stain-resistant label adhered to a vehicular tire through a pressure sensitive adhesive, within the broadest scope of this invention the pressure sensitive label can be adhered to other products that include migratory materials capable of migrating through a label and providing visibly staining of the visually exposed surface thereof, e.g., batteries, candles, etc.

EXAMPLES

Sample 1

The base film employed for receiving the hydroxyl functionalized polyether amine coated layer on it is a three layer, biaxially oriented polypropylene film that includes a 65.1 gauge central core layer, a 3 gauge skin layer for receiving the hydroxyl functionalized polyether amine coating thereon and an opposed. 4.1 gauge heat sealable skin layer.

The skin layer for receiving the hydroxyl functionalized polyether amine coating was a blend of 67% high crystalline polypropylene homopolymer plus 33% maleic anhydride grafted polypropylene. The grafted maleic anhydride provides a tie function for the hydroxyl functionalized polyether amine resin coating.

The hydroxyl functionalized polyether amine resin was applied to the above skin layer in-line between MD and TD orientation steps of a tenter at a thickness of 2.5 gauge.

The core layer was a blend of 82% high crystalline polypropylene homopolymer plus approximately 12% of a masterbatch including 40% TiO2 and 60% polypropylene homopolymer, plus 5% of a hard resin (dicyclopentadiene) and 1.0% WP301 (a process stabilizer-reduce fuming and degradation of the hard resin) provided by Washington Penn in Washington, Pa. The four components were mixed for forming the core layer in the coextrusion process for forming the multilayer film.

The opposed, heat sealable skin layer was a blend consisting of 84.1% C2C3 copolymer plus 15% C3C4 copolymer plus 0.3% Tospearl (cross linked silicone—slip and antiblock additive) plus 0.6% silica antiblock particles.

A conventional pressure sensitive adhesive was applied off-line to the hydroxyl functionalized polyether amine resin layer and was employed to adhere the label to a vehicular tire.

The label was then tested for stain prevention by placing the label and tire in an oven at 150 degrees F. for 72 hours, 7 days and 14 days, respectively. No visible staining was observed.

Sample 2

This sample is similar to Sample 1. Specifically, the base film employed for receiving the hydroxyl functionalized polyether amine coated layer on it is a three layer, biaxially oriented polypropylene film that includes a 2.2 gauge central core layer, a 3 gauge skin layer for receiving the hydroxyl functionalized polyether amine coating thereon and an opposed 3 gauge heat sealable skin layer.

The skin layer for receiving the hydroxyl functionalized polyether amine coating was a blend of 67% high crystalline polypropylene homopolymer plus 33% maleic anhydride grafted polypropylene (Chemtura Polybond 3150). The grafted maleic anhydride provides a tie function for the hydroxyl functionalized polyether amine resin coating.

The hydroxyl functionalized polyether amine resin (Oxy-Bloc 670C1376) was applied to the above skin layer in-line between MD and TD orientation steps of a tenter at a thickness of 2.5 gauge.

The core layer was a blend of 56.5% high crystalline polypropylene homopolymer plus 37.5% of a masterbatch including 40% TiO2 and 60% polypropylene homopolymer, plus 5% of a hard resin (dicyclopentadiene—Schulman CPS606) and 1.0% WP301 (a process stabilizer—reduce fuming and degradation of the hard resin) provided by Washington Penn in Washington, Pa. The four components were mixed for forming the core layer in the coextrusion process for forming the multilayer film.

The opposed skin layer was a blend consisting of 97% of a minirandom polypropylene sold under the designation Total 3354 and sold by Total in Louisiana, and 3% of a masterbatch sold under the designation ABPP05SC by Shulman. This masterbatch included 5% silica antiblock and 95% C2C3 copolymer. This opposed skin layer preferably is oxidatively treated, such as by flame or corona treatment, to make the surface thereof more receptive to printing inks and/or an additional, coated, printing layer, such as a polyurethane coating of the type described in Gillie U.S. Pat. No. 7,378,155.

A conventional pressure sensitive adhesive was applied off-line to the hydroxyl functionalized polyether amine resin layer and was employed to adhere the label to a vehicular tire.

The label was then tested for stain prevention by placing the label and tire in an oven at 150 degrees F. for 72 hours, followed by a two week storage period under ambient conditions. No visible staining was observed.

Sample 3

A sample to be tested employed Taghleef Industries' coextruded PSL 311-122 film, which has a printable, polyurethane resin top coat applied as a coating on one of the skin layers in line between the MD and TD orientation steps. This printable film is described and claimed in Taghleef Industries' U.S. Pat. No. 7,378,155. The subject matter of the '155 patent is fully incorporated by reference into this application.

The label to be tested was formed from a three layer, biaxially oriented, coextruded film sold by Taghleef Industries under the designation PSL 311-122. This film included a 216 gauge core including 86% minirandom polypropylene and 14% TiO2; a 7 gauge polypropylene homopolymer skin layer to which the urethane coating was applied in line, and a 7 gauge, opposed skin layer including 99.85% minirandom polypropylene and 0.15% silica antiblock to which the hydroxyl functionalized polyether amine coating was applied off line.

The hydroxyl functionalized polyether amine coating preferably is OxyBloc670C1376 sold by AkzoNobel, located in Wisconsin. This is 100% hydroxyl functionalized polyether amine resin with no antiblock or anti-foaming additives.

As noted above, the skin layer including the antiblock additive will be coated off line with the above-identified hydroxyl functionalized polyether amine resin to which a small amount of an anti-foaming agent will be added.

In addition, a silica antiblock additive may be added to the hydroxyl functionalized polyether amine resin, but this is optional.

A conventional pressure sensitive adhesive (e.g., a rubber based adhesive; an acrylic emulsion, a UV acrylic or another standard pressure sensitive adhesive composition) will be added to the hydroxyl functionalized polyether amine resin layer. The particular adhesive employed is not a limitation on the broadest aspects of this invention.

As noted earlier, the construction of the three layer film can be varied within wide limits. For example the core can include polypropylene homopolymer as well as mini-random copolymers. The core also can include a blend of polypropylene homopolymer and a polypropylene copolymer. Moreover, in the most preferred embodiments of this invention the core includes a high crystallinity polypropylene homopolymer and a hard resin. Although for some applications the core need not include a high crystallinity polypropylene or a hard resin, a label made from a film including both the high crystallinity polypropylene and hard resin in the core, accompanied by a surface layer including a hydroxyl functionalized polyether amine resin provides the best stain-resistant properties over a wide range of applications.

As an alternative formation technique the hydroxyl functionalized polyether amine coated layer can be applied to the three layer, coextruded film in line, between the MD and TD orientation operations, and the polyurethane coating can be added off line or at the end of the in-line operation; after the film has been biaxially oriented.

Applicant also determined in initial testing that the adhesive utilized to attach the label to a tire may have an effect on the stain-resistant properties of the label, although the test results were not consistent and actually were confusing. For example, labels that included a hydroxyl functionalized polyether amine resin layer but without a hard resin in the core became visibly stained after 9 days storage following 72 hour heat treatment at 150 F. when employing a rubber emulsion adhesive (Dynacross 9117), but did not stain when employing a rubber hot melt (DynaHM6028Q). However, a label employing a hard resin in the core with a hydroxyl functionalized polyether amine barrier coating passed the staining test when the adhesive was the rubber emulsion adhesive, but failed the staining test when the adhesive was the rubber hot melt. Moreover, in one sample including a hard resin and high crystallinity polypropylene in the core but without a hydroxyl functionalized polyether amine resin layer staining was not observed. Based on these test results no definitive conclusion could be drawn regarding the effect of adhesive composition on the staining properties of the labels of this invention.

In view of the anomalous results reported above, further testing was carried out by applicant, and demonstrated that regardless whether a label included a hard resin and a high crystalline polypropylene in the core if the label does not include a hydroxyl functionalized polyether amine barrier coating it ultimately failed the staining test under severe use conditions, e.g., when used on tires known to exude significant staining, organic components. This testing established that the inclusion of a hard resin and a high crystalline polypropylene polymer in the core are not critical additives in accordance with the broadest aspects of this invention; however, they are believed to enhance the stain-resistant performance of the labels in severe staining environments.

In further testing, applicant determined that in all instances the barrier coating was required on labels used with aggressive tires (e.g., tires that exude significant stain-creating components) in order for the labels to pass the staining test. Labels employing hard resin in a core including high crystalline polypropylene but without a barrier coating did not pass the staining test. In some instances (e.g., use on non-aggressive tires), labels that included a barrier coating on the body thereof passed the staining test even when the body of the label (i.e., single layer structure) included conventional polypropylene, with or without a hard resin, or high crystallinity polypropylene, with or without an hard resin.

Thus, in accordance with the broadest aspects of this invention the labels need to include a barrier coating of a hydroxyl functionalized polyether amine resin layer. Preferably, but not a limitation on the broadest aspects of this invention, the label also should include in the core of a multilayer label structure or in the body of a single layer label structure either: (1) a high crystalline polypropylene, with or without a hard resin; or (2) a conventional polypropylene with a hard resin. It is believed that if a conventional polypropylene is used in the core or body of the label than a higher percent hard resin is required than if a high crystalline polypropylene is used in the core. In fact, as stated above, it may not be necessary to include a hard resin in the core or body of a label employing high crystalline polypropylene therein.

As an example, and not by way of limitation, applicant has determined that a single layer label structure with a hydroxyl functionalized polyether amine layer thereon met the required staining protocol when the body included 2.5% hard resin, 14% TiO2 and the balance conventional polypropylene; but failed when the percentage of hard resin was reduced to 1.5%. On the other hand, when the body included 14% TiO2 and the balance high crystallinity polypropylene alone or with varying percentages of hard resin, e.g., 1.25%, 2.5% and 3.75%, the label structure met the staining protocol.

What I claim as my invention is:

1. In combination, a plastic label attached to an outer surface of a rubber-based vehicular tire by a pressure sensitive adhesive, said pressure sensitive adhesive being attached to an exposed surface of an inner surface layer of said label, said tire including one or more materials capable of migrating through said label and providing visible stains on an outer exposed surface thereof, said inner surface layer of said label including a hydroxyl functionalized polyether amine resin preventing the material exuded from the tire from migrating through the label thickness to provide visible staining of said outer exposed surface of said label.

2. The combination of claim 1, wherein a maleated polyolefin layer is included between a core layer of the label and said inner surface layer of said label comprising said hydroxyl functionalized polyether amine.

3. The combination of claim 1, wherein said label is a single, extruded film layer including said inner surface layer coated thereon.

4. The combination of claim 1, wherein said label is a multilayer structure including an interior core layer employing a polyolefin homopolymer or copolymer, said inner surface layer being on one side of said core layer and constituting an exposed surface of said label including the pressures sensitive adhesive thereon, and a second layer on the side of said core layer opposed to said inner surface layer.

5. The combination of claim 1, wherein said outer exposed surface includes the plastic label includes a visible layer spaced outwardly from said inner layer and including printed indicia thereon.

6. The combination of claim 4, wherein said second layer includes polyurethane resin.

7. The combination of claim 4, wherein said core layer and said inner surface layer are biaxially oriented, said second layer being a urethane coating applied to the core layer between a machine direction orientation and a transverse direction orientation of a two-step tentering operation.

8. The combination of claim 4, wherein said core layer is biaxially oriented and said inner surface layer of said hydroxyl functionalized polyether amine being applied to the core layer between a machine direction orientation and a transverse direction orientation of a two-step tentering operation.

9. The combination of claim 3, wherein said single extruded film includes a homopolymer polypropylene and a hard resin.

10. The combination of claim 3, wherein said single extruded film includes a conventional polypropylene and a hard resin, said hard resin being present in an amount of at least 2.5% by weight, based on the weight of the monolayer structure.

11. The combination of claim 4, wherein said core layer includes a homopolymer polypropylene and a hard resin.

12. The combination of claim 4, wherein said core layer includes a high crystalline polypropylene and hard resin therein.

13. The combination of claim 4, wherein said core layer includes a conventional polypropylene and a hard resin, said hard resin being present in an amount of at least 2.5% by weight, based on the weight of the monolayer structure.

* * * * *